US012719150B2

(12) United States Patent
Leo et al.

(10) Patent No.: US 12,719,150 B2
(45) Date of Patent: Aug. 25, 2026

(54) ANTENNA PROVIDING WINDOW MOUNTABLE SEMITRANSPARENT SUNSHADE

(71) Applicant: STI-CO Industries, LLC, Orchard Park, NY (US)

(72) Inventors: Alexander Vasyl Leo, Orchard Park, NY (US); Christopher John Goetz, Hamburg, NY (US); Jay Robert Spoto, Orchard Park, NY (US); Andrew David Trank, Orchard Park, NY (US)

(73) Assignee: STI-CO Industries, LLC, Orchard Park, NY (US)

( * ) Notice: Subject to any disclaimer, the term of this patent is extended or adjusted under 35 U.S.C. 154(b) by 18 days.

(21) Appl. No.: 18/927,816

(22) Filed: Oct. 25, 2024

(65) Prior Publication Data

US 2025/0141085 A1 May 1, 2025

Related U.S. Application Data

(60) Provisional application No. 63/593,674, filed on Oct. 27, 2023.

(51) Int. Cl.

*H01Q 1/12* (2006.01)
*H01Q 5/50* (2015.01)

(52) U.S. Cl.

CPC ............. *H01Q 1/1271* (2013.01); *H01Q 5/50* (2015.01)

(58) Field of Classification Search

CPC ........ H01Q 1/1271; H01Q 1/44; H01Q 5/371; H01Q 5/50

See application file for complete search history.

(56) References Cited

U.S. PATENT DOCUMENTS 5,349,362 A 9/1994 Forbes et al.
5,355,144 A 10/1994 Walton et al.
(Continued)

FOREIGN PATENT DOCUMENTS

CN 1856901 * 8/2021 ........... H01Q 1/1271
EP 2 649 671 B1 11/2016
(Continued)

OTHER PUBLICATIONS

STI-CO Industries, Inc. Catalog, STI-CO Stinger, LTE Antennas for Covert OPS, pp. 1, 3, 33, and 36, 2021.
(Continued)

*Primary Examiner* — Thien M Le

(74) *Attorney, Agent, or Firm* — Kenneth J. LuKacher Law Group

(57) ABSTRACT

An antenna mountable to a window to provide non-destructive installation and removal therefrom. The antenna has a substrate of dielectric material having a first surface with patterned conductive material providing a main radiator and ground plane, and a back surface of patterned conductive material providing a feeding circuit, which capacitively conveys and receives, via the substrate, RF signals with the main radiator and ground plane. The main radiator and ground plane, and preferably the feeding circuit, are each radiating structures to achieve different frequency ranges, such as over VHF, UHF, and cellular bands, with wideband performance. The antenna is configured to resemble a semi-transparent sunshade by the antenna body being perforated, through the front and back thereof, with holes enabling a majority of the antenna body to appear semitransparent for screening sunlight. One or more fixtures are utilized for detachably mounting the antenna along a surface of a window.

28 Claims, 13 Drawing Sheets

(56) References Cited

U.S. PATENT DOCUMENTS

| | | | | |
|---|---|---|---|---|
| 5,565,877 | A | 10/1996 | Du et al. | |
| 5,757,324 | A | 5/1998 | Helms et al. | |
| 5,771,026 | A | 6/1998 | Stengel, Jr. | |
| 5,926,145 | A | 7/1999 | Honma | |
| 6,222,503 | B1 | 4/2001 | Gietema et al. | |
| 6,249,254 | B1 | 6/2001 | Bateman et al. | |
| 6,677,901 | B1 | 1/2004 | Nalbandian | |
| 6,861,985 | B2 | 3/2005 | Toncich et al. | |
| 7,227,500 | B2 | 6/2007 | Oshima et al. | |
| 7,443,347 | B2 | 10/2008 | Mei | |
| 7,656,358 | B2 * | 2/2010 | Haziza | H01Q 13/0233 343/772 |
| 7,847,753 | B2 | 12/2010 | Ishibashi et al. | |
| 8,022,333 | B2 | 9/2011 | Maeuser | |
| 8,269,672 | B2 | 9/2012 | Tinaphong et al. | |
| 8,466,842 | B2 | 6/2013 | Dai | |
| 9,755,299 | B2 | 9/2017 | Lee et al. | |
| 10,326,199 | B2 | 6/2019 | Au | |
| 10,737,469 | B2 | 8/2020 | Droste et al. | |
| 11,024,940 | B2 | 6/2021 | Sayama | |
| 12,494,587 | B1 * | 12/2025 | Omar | H01Q 17/008 |
| 12,512,606 | B2 * | 12/2025 | Ai | H01Q 21/26 |
| 12,519,242 | B2 * | 1/2026 | Smith | H01Q 9/30 |
| 12,519,664 | B2 * | 1/2026 | Tran | H01Q 3/46 |
| 2005/0059428 | A1 | 3/2005 | Tung | |
| 2005/0146478 | A1 * | 7/2005 | Wang | H01Q 21/24 343/770 |
| 2008/0252537 | A1 | 10/2008 | Petros | |
| 2010/0171670 | A1 | 7/2010 | Jesson et al. | |
| 2010/0225547 | A1 | 9/2010 | Lan et al. | |
| 2016/0087327 | A1 | 3/2016 | Niihara et al. | |
| 2022/0059948 | A1 | 2/2022 | Sayama et al. | |
| 2024/0275031 | A1 * | 8/2024 | Bui-Van | H01R 43/205 |
| 2024/0276631 | A1 * | 8/2024 | Wang | H05K 1/165 |
| 2025/0141085 | A1 * | 5/2025 | Leo | H01Q 5/50 |
| 2025/0364719 | A1 * | 11/2025 | Duong | H01Q 3/46 |
| 2026/0005734 | A1 * | 1/2026 | Cho | H04B 7/0413 |

FOREIGN PATENT DOCUMENTS

| | | | |
|---|---|---|---|
| KR | 20110001414 | U | 2/2011 |
| KR | 20120118328 | A | 10/2012 |
| WO | WO 01/35116 | A1 | 5/2001 |

OTHER PUBLICATIONS

Motor Trend Side Window Sunshade, Amazon.com, two screenshots captured Oct. 5, 2023.

* cited by examiner

ANTENNA PROVIDING WINDOW MOUNTABLE SEMITRANSPARENT SUNSHADE

This application claims priority to U.S. Provisional Patent Application No. 63/593,674, filed Oct. 27, 2023, which is incorporated herein by reference.

FIELD OF THE INVENTION

The present invention relates to an antenna providing a semitransparent sunshade, and in particular to an antenna providing a semitransparent sunshade mountable along a window of a vehicle or building. By providing an antenna that both appears and operates as a sunshade as may be typically present along a window, such as a side window of a car, truck or van, the antenna provides a disguised antenna for covert usage. The antenna further is portable in that it may be removably mountable along a window for placement in different vehicles. The term sunshade herein refers to any shade or blind that may be mountable along a window which operates to screen sunlight.

BACKGROUND OF THE INVENTION

There has been a proliferation of RF (radio frequency) antennas and an increasing demand to maintain high fidelity communication channels for land mobile radio use. These devices are typically installed permanently or through magnetic mounts to a vehicle body, such upon the roof exterior, to achieve a quarter wave monopole antenna with omnidirectional performance. In the case of law enforcement, it is often desired to conceal the antenna within a vehicle to provide a covert antenna. Approaches for concealment of antennas within vehicles include small antennas mounted between a vehicle roof and interior roof liner with a small mast structure extendable along glass, such as STI-CO stinger antenna, model no. CCAS-SB-7-800, sold by STI-CO Industries, LLC of Orchard Park, NY, or non-see-through planar patch antennas attachable in a vehicle as described in U.S. Pat. No. 6,249,254, or hidden behind an object in a vehicle, such as an external vent cover of a truck as described in U.S. Patent Publication No. 2010/0171670. Typical covert vehicle antennas need to be small in size in order to achieve desired concealment, and require that a part of the antenna be coupled to the metal body of the vehicle for proper performance. However, due to their smaller size, the radiator structures or elements of a concealed antenna often lack the wideband performance over multiple RF bands, such as VHF, UHF, and cellular bands, since the minimum length of the monopole antenna must be sized at a quarter wavelength of the lowest operating frequency for optimal radiation efficiency.

Moreover, installation of a concealed antenna can undesirably damage a vehicle and its surfaces due to application of mounts using adhesives, magnets, or drilled holes, which can be an issue where an antenna need only be temporarily installed such as in the case of a rental car. Further, a covert antenna may not be sufficiently covert due to visibility of an undisguised portion of the antenna in the vehicle. Thus, it would be desirable to provide a portable antenna disguised as an object as may often be present in a vehicle for better concealment of the antenna to a casual viewer, and which can enable large volume radiator structures that enable wideband operation over multiple RF bands.

SUMMARY OF THE INVENTION

It is an object of the present invention to provide an antenna mountable along a window of shape and size of a typical vehicle sunshade with distributed holes providing semitransparency, thereby disguising the antenna for concealment as a sunshade.

Another object of the present invention is to provide an antenna mountable along a window enabling multiband and/or wideband operation, such as in VHF, UHF, and cellular bands.

Briefly described, the present invention embodies an antenna having a body composed of a substrate of dielectric material with two opposing surfaces, and two different patterned layers of conductive material each along a different one of the opposing surfaces. A first of the layers is configured for capacitively conveying and receiving RF signals, via the substrate, with a second of the layers, and at least the second of the layer is configured to enable the RF signals to be wirelessly sent and received. A plurality of holes, perforating the body through a front and a back thereof, are distributed along the body to enable a majority of the body to appear semitransparent for screening sunlight where such holes are present.

The front and back of the antenna body are each characterized by a different one of the two opposing surfaces of the substrate and a different one of the first and second of the layers. Preferably, the first and second layers are disposed along the back and front of the antenna body, respectively, where the front will face the physical material (e.g., such as of glass or other transparent composites) of a window.

The holes are distributed along the antenna body to at least appear to be evenly distributed, if not actually evenly distributed, over a first area along each of the front and back of the antenna body. The first area occupies a majority of the antenna body by substantially extending over an entirety of each of the front and back of the antenna body. The antenna body has an edge defining an outer perimeter of the antenna body, and along each of the front and back of the antenna body is a second area between the first area and such edge, where the second area surrounds the first area and preferably is without any of the holes which enable the antenna body to appear semitransparent. The second area operates to frame the first area along both the front and back of the antenna body making the combination of first and second areas along the front and back of the antenna body look like a typical sunshade having semitransparency as may be typically present along a window of a vehicle. Further, the distributed holes enable the antenna body to operate as a sunshade for screening sunlight via the holes when mounted along a window. Semitransparency appearance is enabled by the holes being distributed in two-orthogonal dimensions along the antenna body, preferably tilted at an angle, such as 45 degrees, with respect to a width or length in the case of a generally rectangular shaped body, with adjacent ones of the holes configured in close proximity to each other, such as in a grid or grid-like manner, so that along the first area the antenna body from the back or front thereof looks and operates as a semitransparent screen.

A connector is provided upon the antenna body which is electrically connected to the first of the layers to enable communication of RF signals to be transmitted to and received from the antenna. In particular, the back of the antenna body has a transmission line (strip of conductive material) disposed along with the first of the layers upon the substrate. A first end of the transmission line is coupled to the first of the layers, and the transmission line extends from the first end along a portion of the second area to a second end. The connector is mounted upon the antenna body and connected to the second end of the transmission line along the back of the antenna body. Such connector enables engagement with a mating connector of a cable for conveying and receiving RF signals via the connector to and from the antenna.

In the preferred embodiment, the second of the layers of patterned conductive material provides two different radiating structures, separated from each other along the substrate, operative to wirelessly send and receive RF signals over two different first and second ranges or bands of frequencies, and the first of the layers of patterned conductive material is disposed along the substrate for capacitively conveying and receiving, via the substrate, RF signals with each of the two different radiating structures of the second of the layers and preferably provides another radiating structure to send and receive RF signals over a third range or band of frequencies different from the first and second ranges or bands of frequencies. The radiating structure of the first of the layers is referred to herein as a feeding circuit, and the radiating structures of the second of the layers are referred to herein as a main radiator and a ground plane. Each of the feeding circuit, main radiator, and ground plane represents a different radiating structure (e.g., a monopole RF resonating structure) which wirelessly sends and receives RF signals along different frequency ranges or bands to provide the antenna three bands of operation, such as for example, VHF, UHF, and cellular bands. While each of the bands may be wide, it has been found that two or more of the radiating structures operate in combination to enable wideband performance over a fourth band inclusive of two successive ones of the three bands along the RF spectrum and such frequencies extending between such two successive bands. Such fourth band may be due to different ones of the radiating structures exciting higher order modes in other ones of the radiating structures along same or different surfaces of the substrate.

Fewer than three bands of antenna operation may optionally be provided if desired. Thus, in a less preferred embodiment, the feeding circuit does not provide a monopole radiating structure, and only the main radiator and optionally the ground plane of the second of the layers are operative as monopole radiating structure(s) to enable RF signals to be sent and received. In a further less preferred embodiment, the ground plane is not operative as a monopole radiating structure, and only the feeding circuit and the main radiator provide monopole radiating structures operative to send and receive RF signals over two different ranges or bands of frequencies.

The antenna body is mountable along an interior surface of a window utilizing one or more fixtures. When so mounted, the holes enable the antenna body to appear and operate as a sunshade for screening sunlight from the window. For example, the one or more fixtures may be suction cups, one or more clips, a deformable member, or double-sided clear tape, but other mounting fixture(s) may be used. When suction cups are utilized, they are attached to extend from the front of the antenna body, spaced from each other, at positions adjacent the edge that defines the outer perimeter of the antenna body, such as along the upper two or all four corners in the case of a generally rectangular shaped antenna body. When one or more clips are utilized, each clip comprises one end attached to the antenna body and another end with a hook member that hooks over a top edge of the physical material providing the window as in the case of a movable/rollable up and down window of a vehicle. When a deformable member is utilized, it is positioned along an outer perimeter of the antenna body enabling the antenna to press-fit against a frame of a window. When double-sided clear tape is utilized, the tape is disposed between the front of the antenna body and the interior surface of the window and preferably provides little or no adhesive residue when the antenna needs to be removed from the window. Other means than the above-described fixtures may be used for similarly enabling detachable mounting of the antenna to and/or along an interior surface of a window, which unlike typical covert antennas, is preferably non-destructive by having no permanent window mount requirements to either the window, or the vehicle or structure having such window.

The antenna body is preferably rectangular having an upper portion with the holes enabling the antenna body to appear semitransparent, and a lower portion without such holes that protrudes downward from the upper portion. To mount the antenna to a window of a vehicle, the antenna body is positioned along the window such that the front the antenna faces the interior surface of the window and the lower portion of the antenna body is inserted into the window slot of the vehicle's door from which the window extends upward, such that the lower portion is substantially or entirely hidden from view and the second area along the upper portion appears even along the top and bottom of the antenna body when viewed along the window to provide the appearance of a typical sunshade for a vehicle. With the lower portion mounted in the slot of the window, the upper portion attaches to the interior surface of the window by fixtures, preferably two suction cups along the upper two corners of the antenna body. In another embodiment, the antenna body may be provided without such lower portion, a slot of a vehicle door is not utilized for mounting the antenna, and fixtures, preferably suction cups each attached along one of four corners of the antenna body, are provided for mounting the antenna to the interior surface of a window.

The antenna body preferably is coated black in color so that when mounted to a window the antenna appears to a casual viewer as a sunshade for screening sunlight. Further, the body may be square, rectangle or other shape that mimics the shape of a sunshade as may be present in a vehicle with optional rounded corners.

In the preferred embodiment, the substrate of dielectric material, and first and second layers of conductive material formed thereupon, each extend along planes parallel to each other. When the substrate of dielectric material has a curvature, the first and second layers of conductive material formed thereupon each follow the curvature along their respective surface of the substrate, which is useful where such curvature may approximate the curvature of the surface of a window upon which the antenna will be mounted.

The present invention also embodies an antenna having a body composed of a substrate of dielectric material having two opposing surfaces each having one of two different patterned layers of conductive material, in which a first of the layers provides a first radiating structure over a first frequency band, and the second of the layers provides a second radiating structure over a second first frequency band and a third radiating structure over a third frequency band. At least two of the first, second, and third radiating structures are disposed along the body to enable the antenna to further operate over frequencies between two successive ones of the first, second, and third frequency bands along the RF spectrum. The first of the layers is disposed along the substrate for capacitively conveying and receiving RF signals with each of the second and third radiating structures via the substrate. The two radiating structures operating in combination enable wideband performance over a fourth frequency band inclusive of two successive ones of the first, second, and third frequency bands along the RF spectrum and the frequencies between such two successive ones of the first, second, and third frequency bands.

The present invention further embodies a method for making a semitransparent sunshade antenna for screening sunlight comprising the steps of: forming a body composed of a substrate of dielectric material having two opposing surfaces, each having one of two different patterned layers of conductive material, in which a first of the layers is configured for capacitively conveying and receiving RF signals, via the substrate, with a second of the layers, and at least the second of the layers is configured to enable RF signals to be wirelessly sent and received; perforating the body, through a front a back thereof, with a plurality of holes distributed along the body to enable a majority of the body appear semitransparent for screening sunlight where the holes are present, wherein the front and back of the body are each characterized by a different one of the two opposing surfaces of the substrate and a different one of the first and second of the layers; and providing a connector upon the body electrically connected to the first of the layers for enabling communication of RF signals to and from the antenna. In the preferred embodiment, the method further includes the step of coating the antenna body to be uniformly black in color to have an appearance of a typical sunshade when applied to a window of a vehicle.

The conductive material patterned along the two surfaces of the substrate of the above-described antenna, and method for making same, provides desired RF characteristics of the antenna. Different patterning may be provided than shown in the figures to provide different RF characteristics with less or more than three frequency ranges or bands of operation.

BRIEF DESCRIPTION OF THE DRAWINGS

The foregoing objects, features and advantages of the invention will become more apparent from a reading of the following description in connection with the accompanying drawings in which.

DETAILED DESCRIPTION OF THE INVENTION

Figure 3:
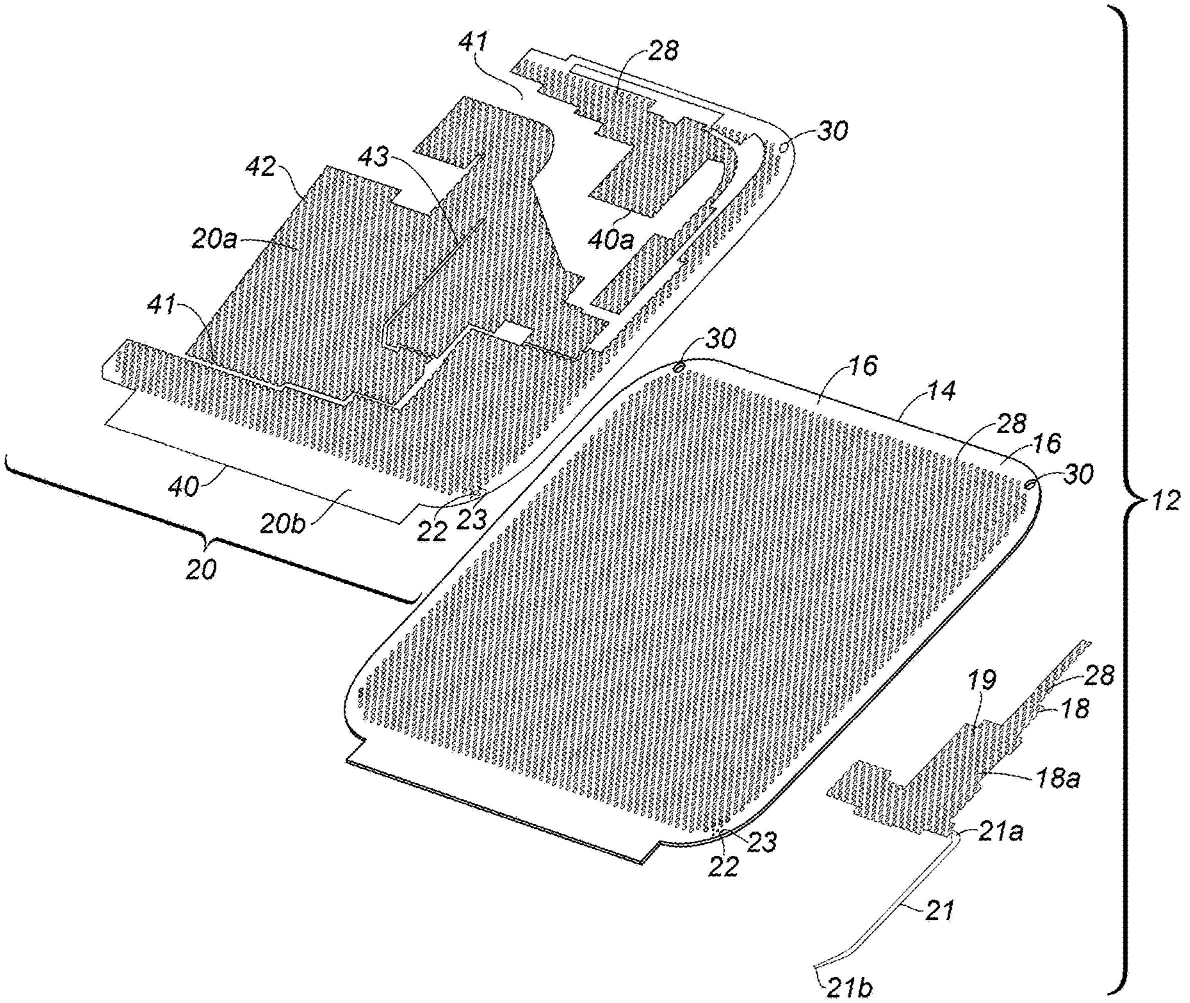
FIG. 3 is a perspective exploded view of the body of the antenna of FIGS. 1A-D in which antenna mounting fixtures and connector components are removed.

Referring to FIGS. 1A-D, 2, 4A, 4B, and 5, an antenna 10 of the present invention is shown having a body 12 composed of a substrate 14 of dielectric material having two opposing surfaces of a back surface 15 and a front surface 16, a first layer 18 of patterned electrically conductive material disposed along back surface 15 of substrate 14, and a second layer 20 of patterned electrically conductive material disposed along front surface 16 of substrate 14. As such, a back 11*a* of body 12 of antenna 10 has first layer 18 and exposed surface of the substate's back surface 15 not covered by first layer 18, and a front 11*b* of body 12 of antenna 10 has second layer 20 and exposed surface of the substrate's front surface 16 not covered by second layer 20. Body 12 has an extending lower portion or base 12*a* that downwardly protrudes along the bottom of antenna 10 from an upper portion 12*b* of the antenna. As will described later below in connection with FIGS. 8A, 8B, and 9, body 12 may be provided without lower portion 12*a* in another embodiment of antenna 10. FIG. 3 is an exploded views of first and second layers 18 and 20 and substrate 14 forming body 12 of antenna 10. The particular asymmetric conductive material patterning of layers 18 and 20 upon substrate 14 provides desired antenna 10 performance, where first layer 18 represents a region or plate 18*a* upon back surface 15, and second layer 20 represents two separate regions or plates 20*a* and 20*b* along front surface 16 separated on the substrate's front surface 16 by a gap 41 of exposed dielectric material along front surface 16. Also, a transmission line 21 extends along back surface 15 of substrate 14. Transmission line 21 is a strip of conductive material having one end 21*a* extending to first layer 18, and another end 21*b* extending about the perimeter of a hole 22 through body 12 for mounting a connector 24.

The first layer 18 is configured for capacitively conveying and receiving (by capacitive coupling) RF signals to and from the second layer 20 via substrate 14, and the first layer 18 and second layer 20 are configured to enable RF signals to be sent and received by antenna 10 over multiple ranges or bands of frequencies. First layer 18 along region 18*a* operates as a feeding circuit 19 for antenna 10 with transmission line 21 providing a signal feed point at end 21*b* via connector 24 for the antenna, as such transmission line 21 electrically connects connector 24 with first layer 18. Region 20*b* of second layer 20 provides a signal return ground plane 40, and region 20*a* of second layer 20 provides a main radiator 42 of the antenna 10, in which ground plane 40 and main radiator 42 are coplanar and separated on the substrate's front surface 16 by gap 41. The portion of second layer 20 providing ground plane 40 along region 20*a* meanders along front surface 16 of substrate 14 from the bottom of body 12 (including lower portion 12*a* when present) along one side of body 12 and then along the top of body 12 to a region 40*a* of ground plane 40. Gap 41 varies in shape and width between regions 20*a* and 20*b* along surface 16 of substrate 14.

Figure 1A:
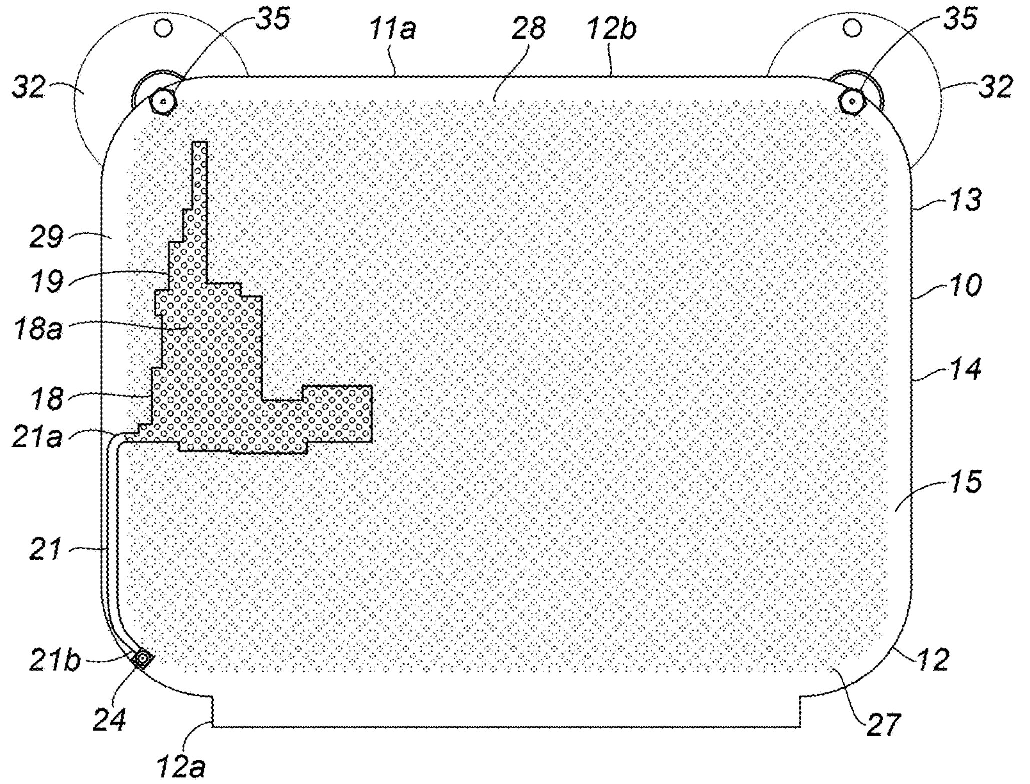
FIGS. 1A, 1, 1C, and 1D ("1A-D") are back, front, back perspective, and side, respectively, of the antenna of the present invention.
Figure 1B:
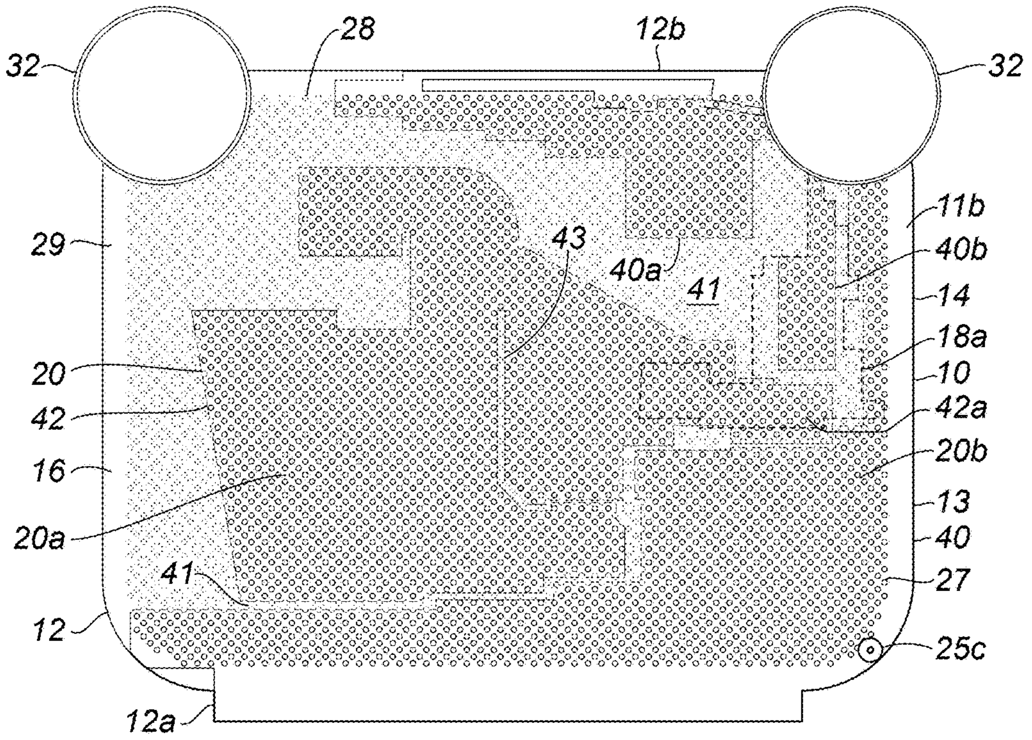
FIG. 1E is another side view similar to FIG. 1D for an embodiment of the antenna having a body which is curved, rather than non-curved as shown in FIGS. 1A-D.
Figure 1C:
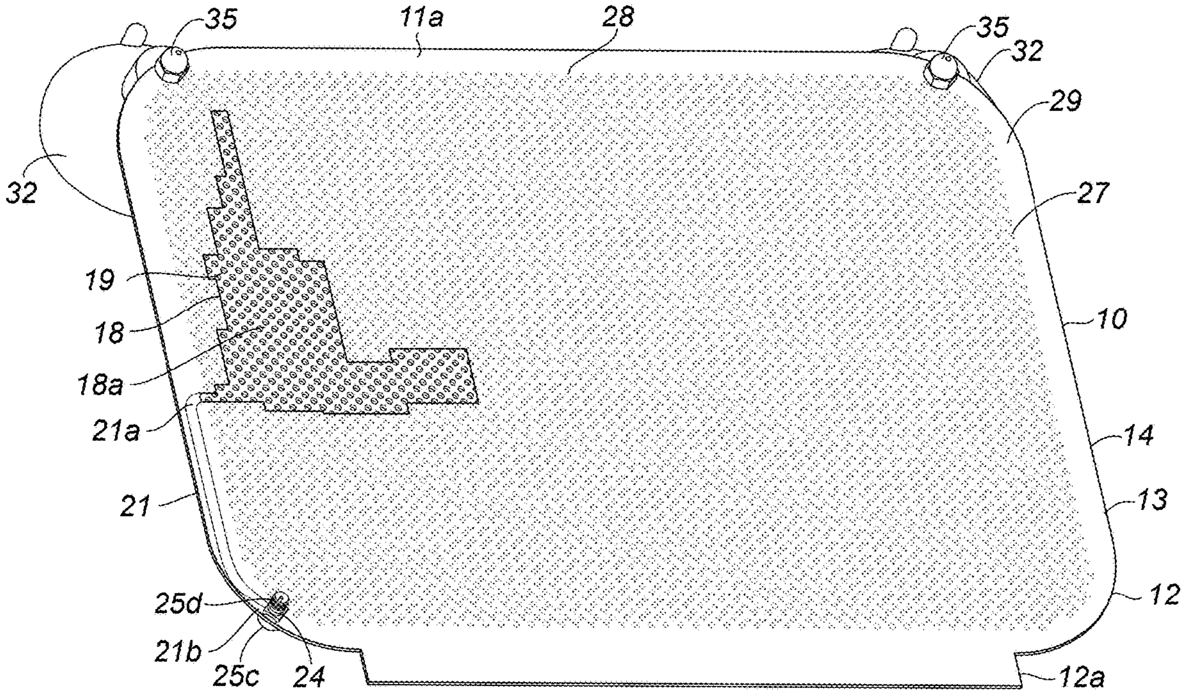
Figure 1D:
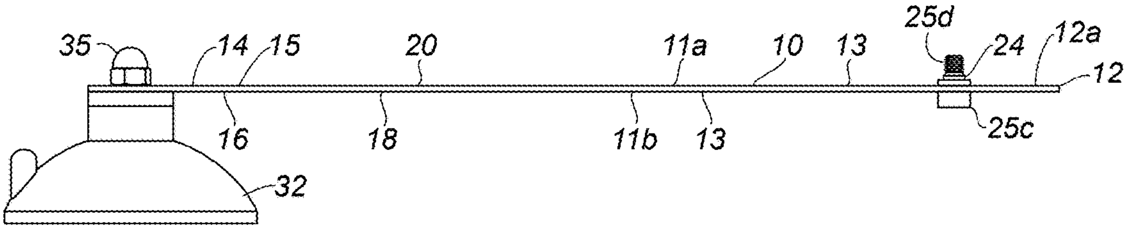

As best shown in FIG. 1B, separated by the dielectric material of substrate 14, first layer 18 (shown outlined by a dashed line) operates as feeding circuit 19 for ground plane 40 and main radiator 42 by being co-located upon substrate 14 over a portion 40*b* of region 20*b* providing ground plane 40, and over a portion 42*a* of region 20*a* providing main radiator 42. This is illustrated by the dashed outline of region 18*a* in FIG. 1B showing where region 18*a* of first layer 18 lies on the opposite surface 15 with respect to surface 16 of substrate 14. By co-locating feeding circuit over parts of ground plane 40 and main radiator 42 enables antenna 10 operation by RF signals to be capacitively conveyed and received, via substrate 14, between the feeding circuit 19 and main radiator 42, or between the feeding circuit 19 and ground plane 40.

Each of regions 18*a*, 20*a*, and 20*b* provides a different radiating structure as each are shaped to provide a length of conductive material along substrate 14 for excitation or resonance as a quarter-wave monopole over one of three different ranges of frequencies, thereby enabling RF signals to be wirelessly sent and received over such three different ranges of frequencies. The length of conductive material of each region 18*a*, 20*a*, 20*b* being approximately one quarter of the wavelength of the RF waves about the lowest in each range associated with that region. In the embodiment shown in the figures, region 20*a* (main radiator 42) has a large conical shape to resonate at a range of frequencies in a low band, such as in the VHF band, region 20*b* (ground plane 40) resonates at a range of frequencies in a first high band, such as in the UHF band, and region 18*a* (feeding circuit 19) resonates in a range of frequencies at a second high band, higher than the first high band, such as in cellular band(s). These different bands will be described further below in connection with FIG. 7 where it was found that antenna 10 extends beyond their designed frequency ranges to provide wideband performance over the entire first and second high bands and frequencies therebetween. Other patterning of conductive material of layers 18 and 20 along substrate 14 may be used to obtain different RF characteristics of antenna 10 so long as first layer 18 is co-located upon substrate 14 over a portion of second layer 20 that provides the ground plane 40 and over a portion of second layer 20 that provides main radiator 42. By configuring the body 12 of antenna 10 to form the shape and size of a typical window mountable sunshade provides the additional benefit of providing a larger volume along surfaces 15 and 16 of substrate 14 for extending monopole radiating structures of regions 18*a*, 20*a*, and 20*b* of conductive material than is generally available in typical interior mounted covert antennas for vehicles.

Figure 1E:
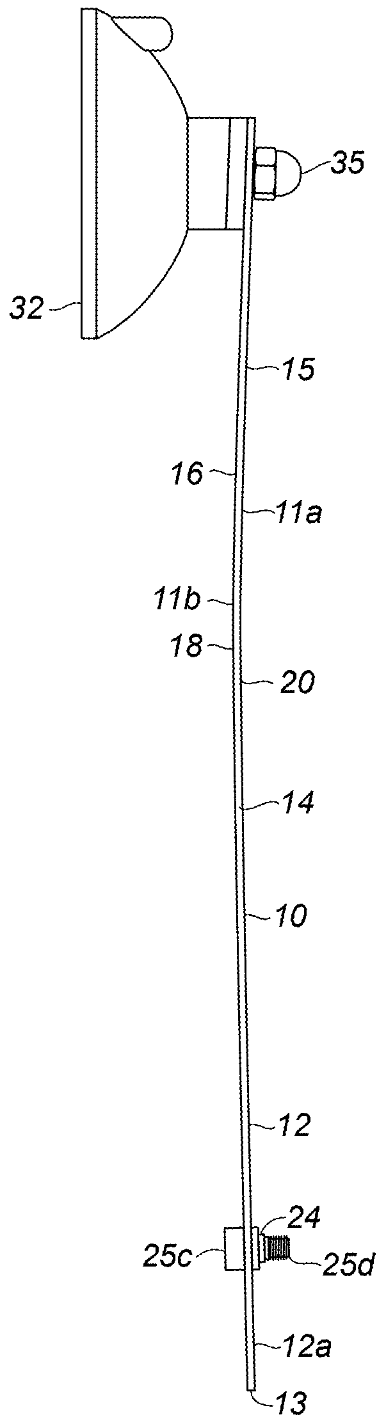
Figure 2:
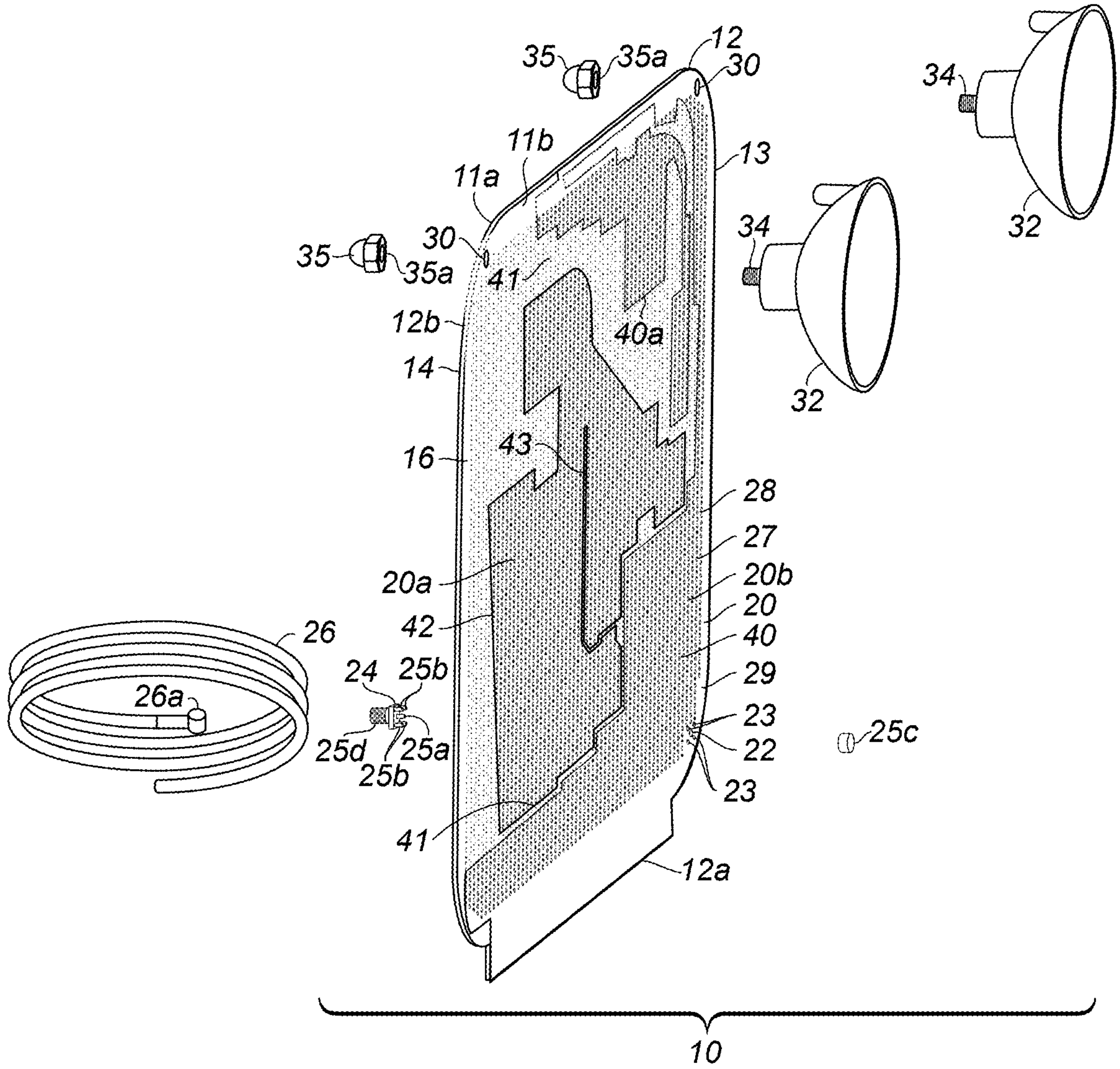
FIG. 2 is a perspective exploded view of the antenna of FIGS. 1A-D in which mounting fixtures and connector components are shown detached from the body of the antenna, and a cable is shown suitable for connecting with the antenna's connector.

The body 12 of antenna 10 is preferably planar, where layers 18 and 20, and substrate 14 each extend along planes parallel to each other. Optionally, substrate 14 has curvature as illustrated for example in FIG. 1E that may approximate the surface curvature of a window along which the antenna will be mounted, in which layers 18 and 20 when each formed integral with such substrate 14 will follow its curvature along back surface 15 and front surface 16, respectively, thereof. Where the body 12 has height and width dimensions, the curvature shown in FIG. 1E is along such height of body 12, but may be along one or more of the height and width dimensions as desired depending on the surface curvature of the window.

Figure 4A:
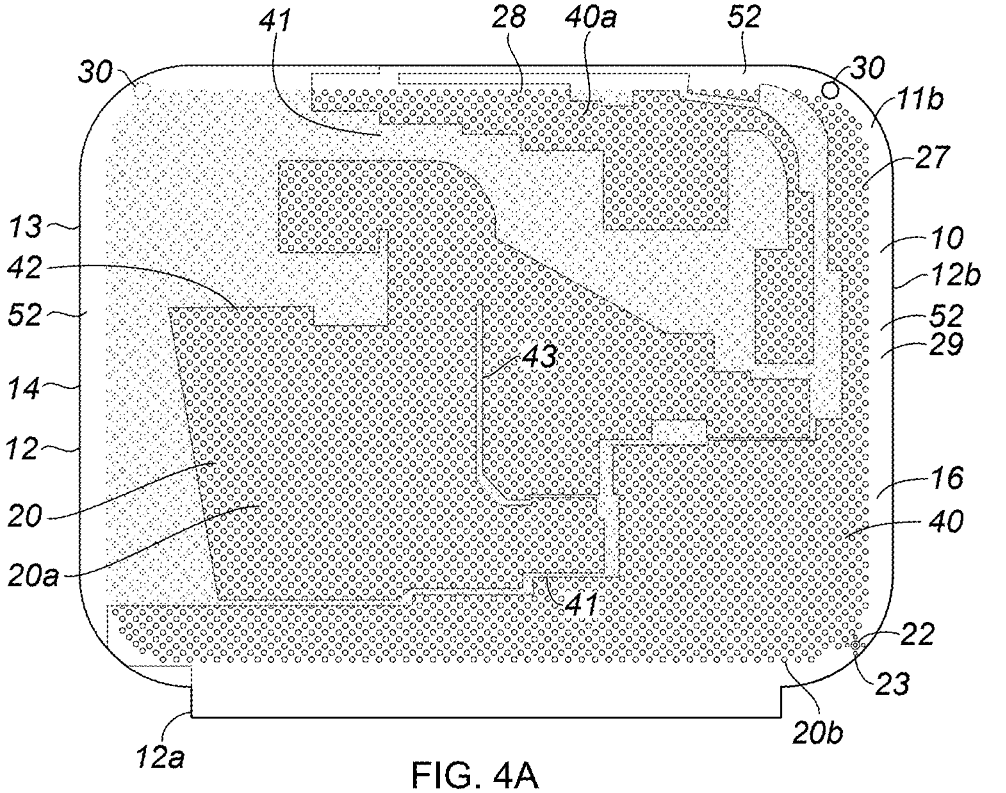
FIGS. 4A and 4B is a front view and a perspective view taken from the front, respectively, of the antenna of FIGS. 1A-D with the antenna mounting fixtures and connector components removed.
Figure 4B:
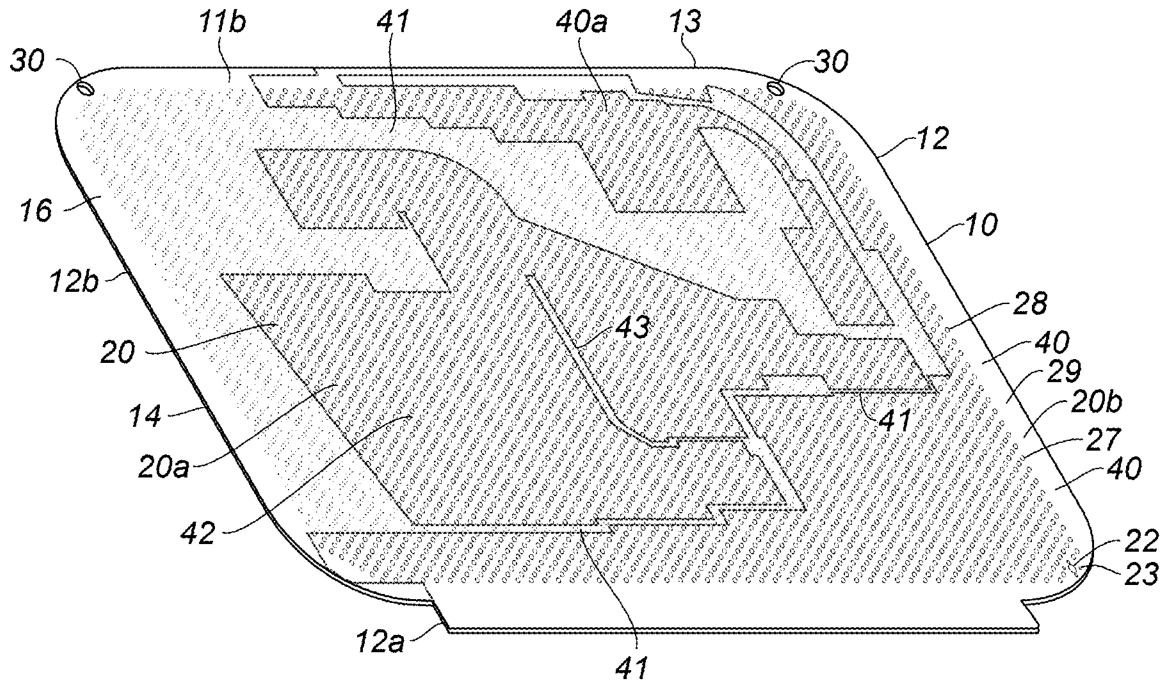
Figure 5:
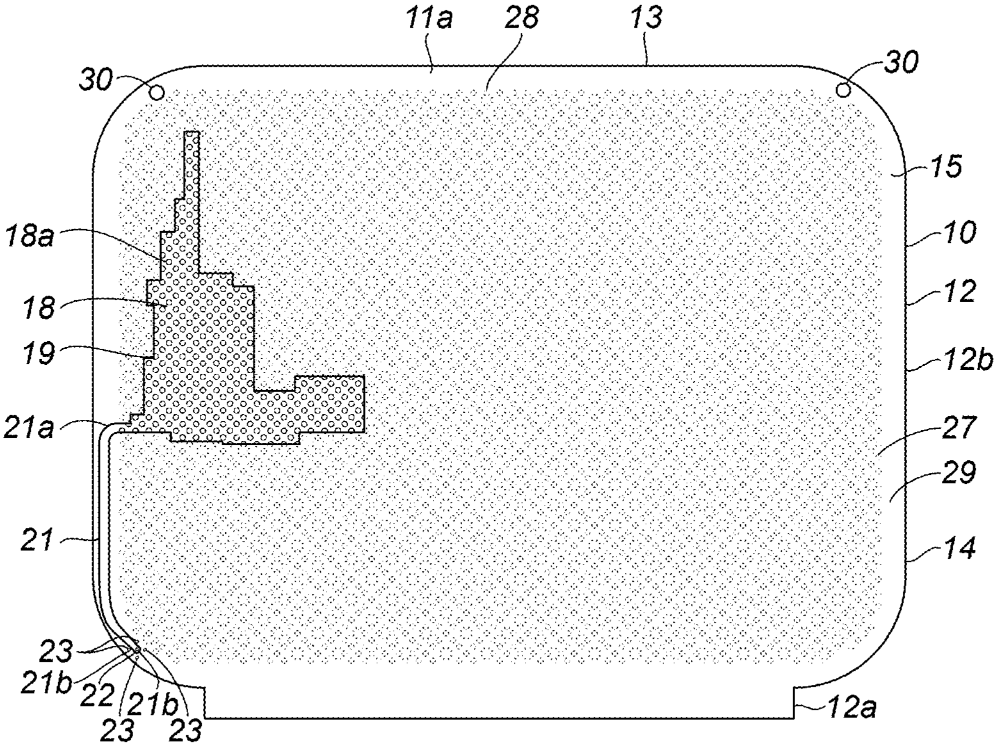
FIG. 5 is a back view of the antenna of FIGS. 1A-D with the antenna mounting fixtures and connector components removed.

As best shown in FIGS. 1A-D and 2, connector 24 is mounted onto or upon the back 11*a* of body 12 of antenna 10, so that a central pin or conductor member 25*a* of connector 24 extends through hole 22, and four ground pins or conductor members 25*b* of connector 24 each extend through one of four holes 23 through body 12, where holes 23 are spaced about hole 22. Once members 25*a* and 25*b* are received in their respective holes 22 and 23, end 21*b* of transmission line 21 is soldered to member 25*a*, and ground members 25*b* are soldered to second layer 20 that extends along the perimeter of holes 23 thereby electrically connecting members 25*b* to the portion of second layer 20 providing the ground plane 40 of the antenna 10. To assist in preventing connector member 25*a* from contacting the second layer 20 when solder is applied thereto to make electrically connection to end 21*b* of transmission line 21, hole 22 along second layer 20 is made larger than the diameter of member 25*a*, as best shown in FIGS. 3, 4A and 4B. A cover 25*c*, such as of plastic material, is applied upon body 12 along front 11*b*, opposite connector 24, over holes 22 and 23 and ends of connector members 25*a* and 25*b*. Cover 25*c* may be retained to body 12 by having central opening sized to frictionally engage the end of connector member 25*a*, but other or additional means such as adhesive may be used to retain cover 25*c* to body 12. A threaded end 25*d* (FIGS. 1C, 1D, and 2) of connector 24, extending perpendicular to the plane of body 10, faces away from back 11*a* to enable engagement with a mating connector 26*a* of a cable 26 (FIG. 2), such as a 50-ohm coaxial cable, for conveying and receiving RF signals via connector member 25*a* to and from transmission line 21, and a ground line to ground plane 40 of antenna 10 via connector members 25*b*, as typical in connecting monopole antennas to RF transmitting and/or receiving equipment (not shown).

A plurality of holes 28 perforating body 12 are distributed substantially along an entirety of body 12 over a central or first area 27 along each of the back 11*a* and front 11*b* of body 12 to enable a majority of body 12, along the front 11*b* and back 11*a* thereof, to appear semitransparent where holes 28 are present. Such holes 28 are each of the same diameter and together operate as a sunshade (or blind) for screening sunlight when antenna 10 is mounted along a window, as shown for example in FIGS. 6A, 6B, and 9. Holes 28 extend through first layer 18 where such first layer covers substrate 14, through substrate 14, and through second layer 20 where such second layer covers substrate 14. An edge 13 defines the outer perimeter of body 12, and along each of the back 11*a* and front 11*b* of body 12, between first area 27 and edge 13 is a second or frame area 29 surrounding area 27 and preferably without holes 28. When lower portion 12*a* of body 12 is present, area 29 extends to lower portion 12*a* of body 12. Area 29 enhances the appearance of antenna 10 as a frame of a typical sunshade when attached to a vehicle window as will be described later below. Transmission line 21 extends along area 29 along back 11*a* adjacent a portion of edge 13, and holes 22 and 23 extend through body 12 along area 29 between back 11*a* and front 11*b* of body 12 of antenna 10.

The holes 28 are distributed along two-orthogonal dimensions of an array along area 27 having adjacent ones of holes

28 in such proximity to each other to configure body 12 to appear semitransparent along area 27 to a viewer, thereby enabling antenna 10 to not only mimic a sunshade, but operate as one as well. In the preferred embodiment, holes 28 are (or at least approximately) disposed in an array at a 45-degree orientation from the horizontal and vertical dimension of body 12 in order to mimic a screen of a sunshade. Thus, when viewed from back 11*a* and front 11*b* of body 12 of antenna 10, holes 28 are distributed in the array in area 27 along two-dimensional rows and columns tilted 45 degrees from the horizontal and vertical defined by the width and height, respectively, of body 12 so that rows and columns of holes 28 appear to extend in grid or grid-like positions along such two-orthogonal diagonal dimensions. The holes 28 along different rows and columns of the array may differ in number. The size, number, and orientation of holes 28 in the figures are illustrative, and other size, number, and/or array orientation (e.g., at zero or other angular degree orientations than shown) may be used. As shown in FIGS. 1A and 1B, holes 28 extend through substrate 14 and depending on their position along body 12 different ones of holes 28 extend through none of layers 18 and 20, and other ones of holes 28 either extend entirely or partially through only one of layer 18 or 20 where such layers are not co-located about substrate 14, or extend entirely or partially through both layers 18 and 20 where such layers are co-located about substrate 14. Thus, as illustrated in FIGS. 1A and 1B, the holes 28 extend through substrate 14 at different positions along body 12 and also through any of layers 18 and/or 20 where present along substrate 14 at such different positions.

To enable mounting of antenna 10 along a window, two holes 30 adjacent edge 13 along two opposite top corners of antenna 10 extend through body 12 along area 29 between back 11*a* and front 11*b* of body 12, and two fixtures in the form of suction cups 32 have their rearwardly extending threaded shaft 34 (FIG. 2) extend from front 11*b* through a different one of holes 30 into a threaded hole 35*a* of a nut 35 along back 11*a*, and then tightening nuts 35 retains suction cups 32 to body 12. For example, suction cups 32 may each have a diameter of 25.4 mm or less and can be installed or mounted directly on flat/smooth surface of a window or other smooth surface. While two suction cups 32 are shown, additional ones of suction cups 32 may similarly provided along area 29 of the antenna. Alternatively, suction cups 32 used to mount antenna 10 may be reversed with respect to back 11*a* and front 11*b* of body 12, such that back 11*a* faces window 37, and connector 24 is instead mounted to front 11*b* using holes 22 and 23. Other fixtures for mounting or installing antenna 10 to a window may alternatively be used than suction cups 32 as will be described later below.

Substrate 14 may be composed of a board of glass-reinforced epoxy laminate material grade FR4, or polyimide, or other dielectric material, cut or formed to a profile of body 12 defined by the shape of its outer perimeter along edge 13. For example, substrate 14 may represent a double-sided circuit board. To form body 12 of antenna 10, the first layer 18 and second layer 20 are formed along substrate 14 using conventional circuit board fabrication. A layer of metallization, such as copper, is deposited along back surface 15, a mask defining the desired pattern of first layer 18 is applied over such metalized back surface 15, and then an etching solution applied to etch away leaving the pattern forming first layer 18. The pattern of second layer 20 is similarly formed with respect to front surface 16 of substrate 14. Alternatively, the first layer 18 and second layer 20 may be printed/deposited by an inkjet printer using conductive material on substrate's back surface 15 and front surface 16, respectively, of substrate 14. Transmission line 21 is formed on substrate 14 when first layer 18 is formed.

Once the layers 18 and 20 are formed along substrate 14, each of holes 22, 23, 28, and 30 are then made. For example, each of holes 22, 23, 28, and 30 are drilled with a desired diameter bit under control of a programmed CNC machine at desired positions along body 12, and at diameter depths in the case of hole 22 in second layer 20. A thin coating layer 50 of a liquid epoxy material of a black color is then applied to the formed body 12. The epoxy material for example may be a black non-conductive solder resist liquid or solution applied to all exposed surfaces on back 11*a* and front 11*b* of body 12, the outer surface of body 12 along its edge 13, and along the interior surfaces of holes 28 and 30. Application of coating layer 50 to body 12 may be by dipping, spraying, or by otherwise coating body 12. To avoid epoxy material when applied from entering holes 22 and 23, adhesive tape, such as masking tape, may be applied to cover holes 22 and 23 along both surface 15 and 16, and then peeled off after the body 12 is coated. Once the liquid epoxy material sets, with application of heat if needed, body 12 is complete, such that body 12 of antenna 10 is of a uniform black color similar to a typical sunshade that may be present in a vehicle. While the manufactured antenna 10 with coating layer 50 provides a black colored body 12 as illustrated in the front antenna view of FIG. 6A and the back antenna view of FIGS. 6B and 9, for purposes of illustration FIGS. 1A, 1B, 1C, 2, 3, 4A, 4B, 5, 8A, and 8B show antenna body 12 without layer 50 to distinguish patterning of the conductive material forming layers 18 and 20 with respect to substrate 14.

Next, connector 24 is mounted to or upon body 12 such that its members 25*a* and 25*b* are received in their respective holes 22 and 23, end 21*b* of transmission line 21 is soldered to member 25*a*, and ground members 25*b* are soldered to second layer 20 that extends along the perimeter of holes 23. Cover 25*c* is then applied to body 12 as described earlier. Fixtures in the form of suction cups 32 are used for mounting antenna 10 to window 37 as shown for example in FIGS. 6A, 6B and 9, where such suction cups 32 are mounted to body 12, via holes 30, using nuts 35 as described earlier.

While black is the preferred color of body 12 of antenna 10 to provide a covert antenna that has the appearance of a sunshade, a different color of coating layer 50 or no coating may be applied to body 12 where a disguised antenna 10 appearance is not desired when applied to a window or other surface. Less preferably, body 12 of antenna 10 may be provided with or without holes 28, and printed and/or painted images, stickers or displays on the antenna 10 are provided along the back 11*a* and/or front 11*b* of body 12 of antenna 10 to disguise the patterning of layers 18 and/or 20 of body 12.

Figure 6A:
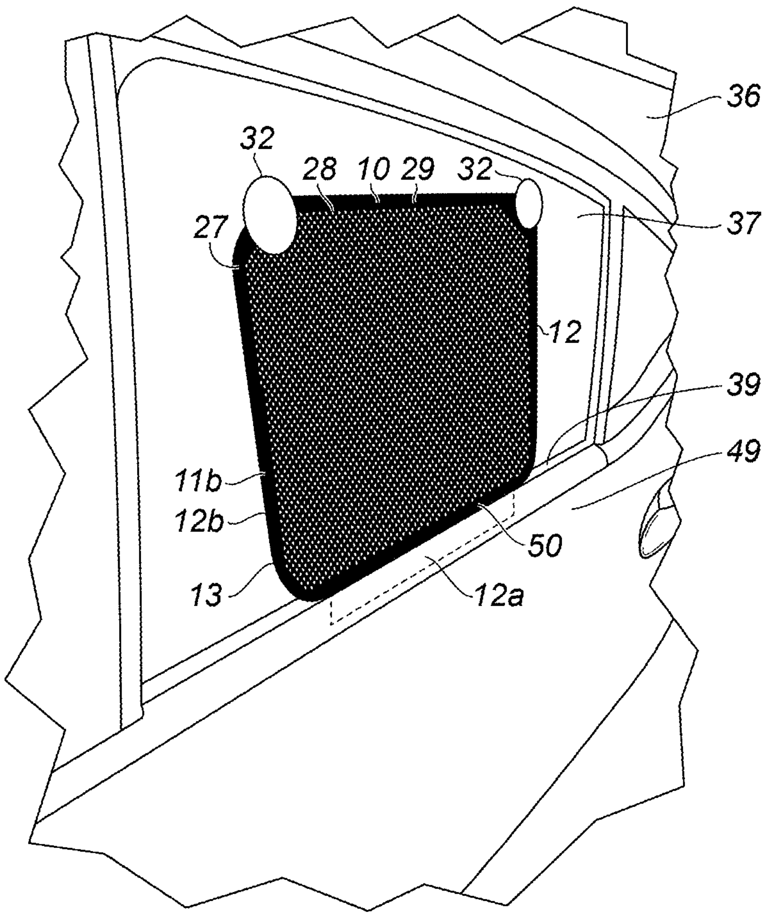
FIGS. 6A and 6B are broken views from the exterior and interior, respectively, of a vehicle depicting an example mounting of the antenna of FIGS. 1A-D along a closed rear window of the vehicle.
Figure 6B:
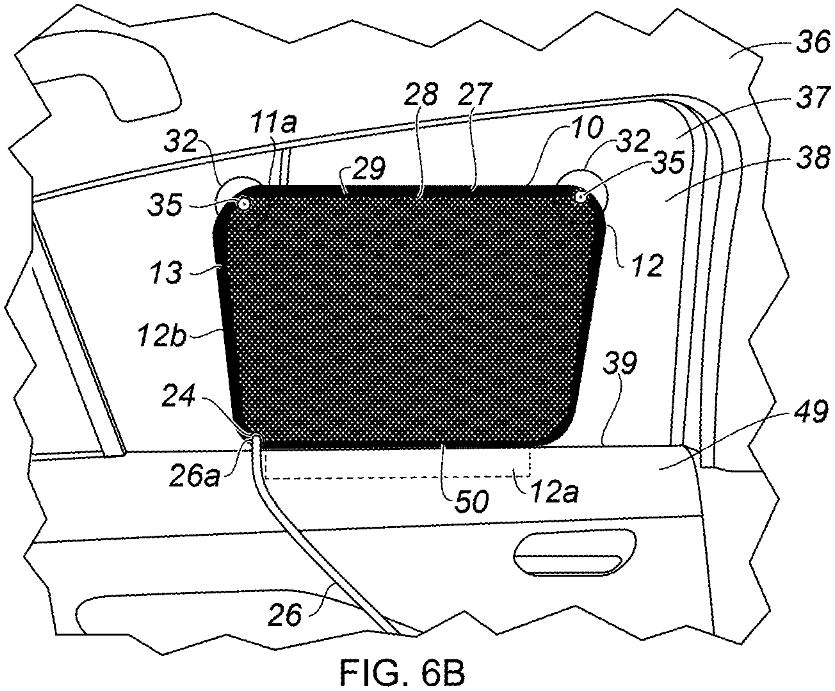
Figure 9:
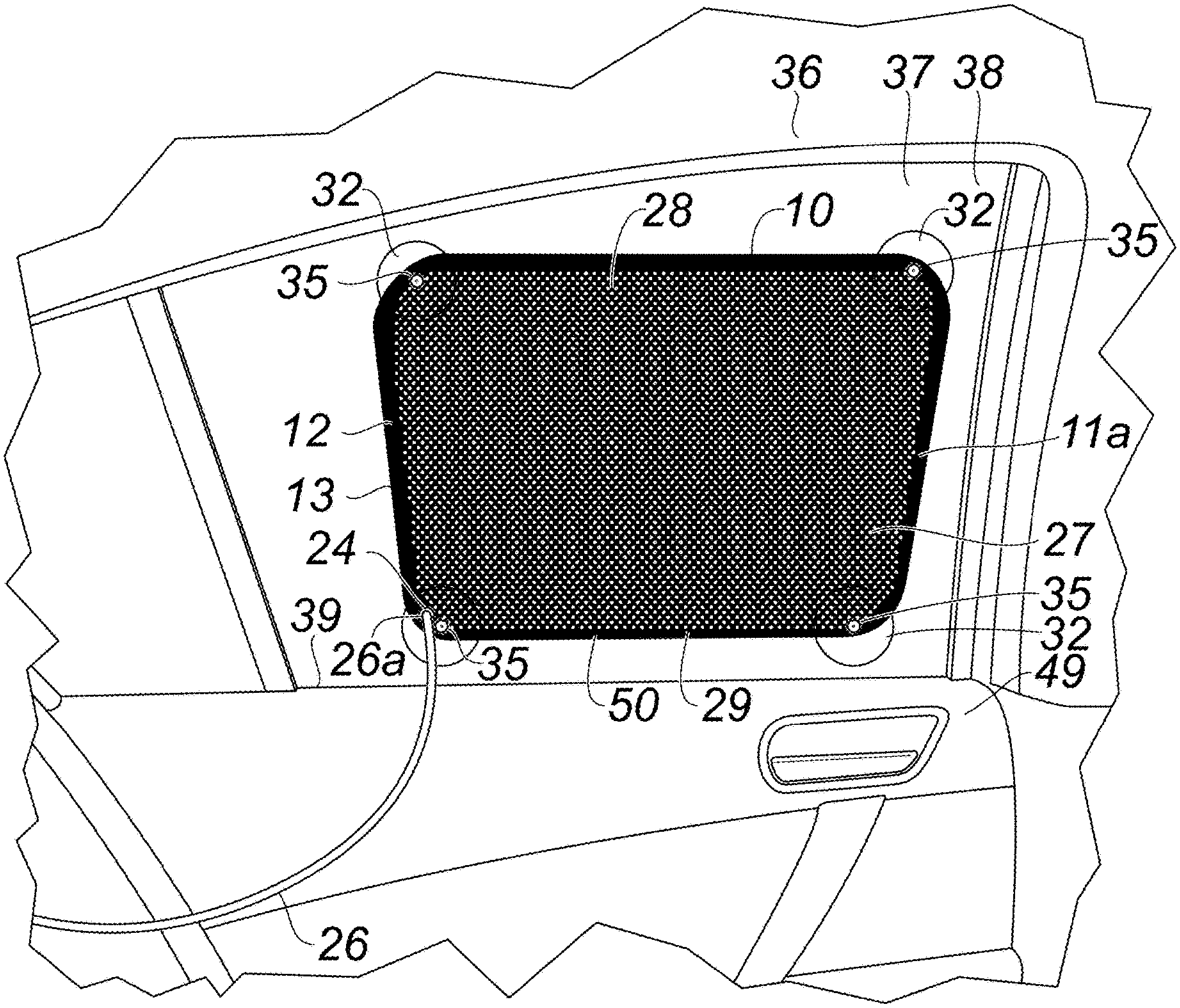
FIG. 9 shows a broken view from the interior of a vehicle depicting an example mounting of the embodiment of the antenna of FIGS. 8A and 8B.

Body 12 of antenna 10 may be sized smaller than (as shown in FIGS. 6A, 6B and 9), or equal to, the size of physical material of the window it would be mounted to. For example, body 12 of antenna 10 may be about 14.2 inches in length, about 11.5 inches in height, and have a maximum thickness of about 0.068 inches (where layers 18 and 20 are present along surfaces 15 and 16, respectively, of substrate 14, with coating layer 50), where substrate 14 is 0.062 inches thick, coating layer 50 is 0.0016 inches thick, and first and second layers 18 and 20 are each 0.0028 inches thick. When present, extending lower portion 12*a* for example may be about 10.3 inches in length, and extends downward about 0.6 inches from the upper portion 12*b* of body 12. However other dimensions may be used as desired. In the preferred embodiment, body 12 of antenna 10 has a very low profile, e.g., maximum thickness of about 7.6 millimeters or less.

As shown in FIGS. 6A and 6B, to mount or install antenna 10 in a vehicle 36, body 12 is positioned along the glass, or other transparent composite material, of a desired window 37 of vehicle 36 such that front 11*b* of antenna body 12 faces the interior surface 38 of window 37 with lower portion 12*a* of antenna body 12 inserted into a window slot 39 of door 49, such that lower portion 12*a* is substantially or entirely hidden from view (as depicted by dashed lines) and the width of the frame provided by area 29 (such width being the distance between outer edge 13 and area 27 occupied by holes 28) appears even along the top and bottom of body 12 when viewed along window 37. Due to the thinness of body 12, lower portion 12*a* can easily be located between surface 38 of window 37 and along any weatherstripping that may extend along slot 39 about the window's frame in door 49. Then, by manually applying pressure from the back 11*a* of body 12 towards window 37, suction cups 32 are forced against surface 38 of window 37 thereby mounting antenna 10 to attach by suction to window 37 where lower portion 12*a* of antenna 10 is retained in slot 39. One end of cable 26 having connector 26*a* is then coupled to engage connector 24 of antenna 10 and the other end of cable 26 to an antenna port of RF equipment (not shown) in the vehicle. As cable 26 extends from connector 24 along area 29 of back 11*a* of antenna body 12, it is hidden to the causal viewer from outside the vehicle to maintain the disguised appearance of antenna 10 as a sunshade. The lower portion 12*a* of body 12 when positioned in slot 39 results in partial contact of antenna 10 with a lower part of the window's interior surface 38 near or along slot 39. The antenna 10 may lie all or partly against the window, or spaced by an air gap from the window.

To release antenna 10 from window 37, body 12 of antenna 10 is manually pulled away from window 37 and upwards from slot 39 after the suction force by cups 32 against window 37 is released by placing one's fingernail or gently sliding a flat head screwdriver head between each of suction cups 32 and window 37 to release their applied suction to the window's interior surface 38. Thus, antenna 10 is portable and readily attachable and removable by being detachably mountable for placement upon different windows in the same vehicle or upon windows of another vehicle as needed.

Once attached to the material, physical window 37, such as of glass or other transparent composites, in a vehicle (or upon another window for locating antenna 10 such as along an interior surface of a window of a building or other structure), the presence of holes 28 provides semitransparency about area 27 along back 11*a* and front 11*b*, which with body 12 being preferably planar and generally square or other rectangular shape with optional rounded corners and optional lower portion 12*a*, enables the antenna 10 to appear like a typical sunshade or blind as may be typically mounted on a window, thereby disguising antenna 10 and providing a covert antenna. Further, in the case of antenna 10 with lower portion 12*a* inserted in door window slot 39, by making the frame area 29 appear even along the top and bottom of body 12 promotes the appearance of antenna 10 as a typical sunshade or blind in a vehicle.

As the black coating layer 50 covers exposed portions of surfaces 15 and 16 of substrate 14 and the conductive material of layers 18 and 20, layers 18 and 20 of antenna 10 are not readily discernable to human eyes at a distance, such as 5 feet, away from antenna 10 when viewed through window 37. When protruded lower portion 12*a* of antenna 10 is inserted into a door window slot 39 (FIGS. 6A and 6B), the ground of the vehicle is utilized in antenna 10 operation. However, when antenna 10 is mounted elevated along the window 37, spaced a distance above door window slot 39 as shown in FIG. 9 for the embodiment of antenna 10 of FIGS. 8A and 8B without lower portion 12*a*, the antenna 10 is disposed above the vehicle ground and operates independent of the ground the vehicle may provide. Unlike other covert antennas when mounted in a vehicle, antenna 10 thus need not be directly mounted to or adjacent the metal body of the vehicle, hence antenna 10 can be used in a vehicle even when its body is made of aluminum or fiberglass. In addition to the mounting surfaces for antenna 10 being windows, other mounting surfaces or structures for antenna 10 may include tiles and/or apertures surrounded by metallic framing.

In operation, with connector 24 of antenna 10 coupled by cable 26 to RF transmitting and/or receiving equipment (not shown), the first layer 18, electrically connected to connector 24 via transmission line 21, provides feeding circuit 19 for antenna 10 by capacitively feeding and receiving RF signals to and from second layer 20 through the dielectric material of substrate 14, since as described earlier portions of first layer 18 and portions 40*b* and 42*a* (FIG. 1B) of the second layer 20 providing ground plane 40 and main radiator 42, respectively, of antenna 10 are co-located over each other separated by the dielectric material of substrate 14. The dielectric constant of substrate 14 is selected to enable capacitive feeding and receiving RF signals, similar to that of typical planar patch antennas.

Main radiator 42, provided by region 20*a* of the conductive material of second layer 20, is shaped to provide a conical shape quarter-wave monopole with a directional pattern. The region 20*b* of the conductive material of second layer 20 outside main radiator 42 provides ground plane 40 of antenna 10. The impedance along gap 41 between ground plane 40 and main radiator 42 along front surface 16 of substrate 14 is preferably set to match the impedance of cable 26. The shape of ground plane 40 along front surface 16 of substrate 14 from the bottom of body 12 (including lower portion 12*a* when present) to along the top of body 12 to region 40*a* enables a defected ground plane structure increasing its electrical length, which can excite higher order modes in main radiator 42. To increase the electrical length of main radiator 42 as a monopole, a slot 43 of exposed dielectric material of substrate 14 is provided along front surface 16 extending within region 20*a* of second layer 20 to gap 41.

Wideband performance of antenna 10 is enabled by gap 41 between ground plane 40 and main radiator 42, along the front surface 16 of substrate 14, providing a resonant slot which generates higher order modes in main radiator 42. In other words, main radiator 42 by being in proximity to the ground plane 40 on the front surface 16 of the dielectric substrate 14 can excite higher order modes in antenna 10. The wideband performance provided antenna 10, as shown for example in FIG. 7, may be considered remarkably wide which make antenna 10 especially versatile. It is believed that the bandwidth and reduced return loss performance of antenna 10 may be due in part to the structure provided by the window 37 upon which the antenna 10 is mounted providing a dielectric load.

Figure 7:
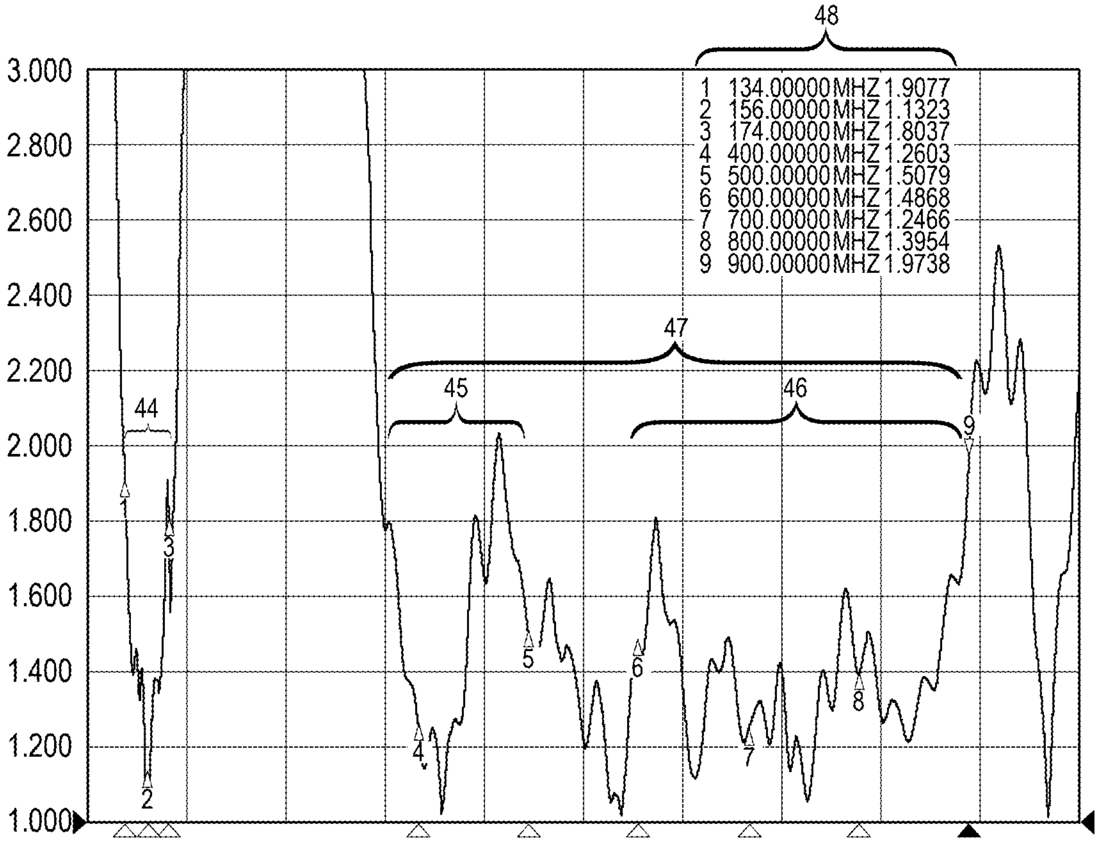
FIG. 7 is a Voltage Standing Wave Ratio (VSWR) versus frequency plot of the antenna of FIGS. 1A-D showing the frequency response or performance of the antenna when mounted to a window.

Referring to FIG. 7, a VSWR plot of the operation of antenna 10 when mounted to a window 37, such as depicted in FIGS. 6A and 6B, is shown illustrating performance of antenna 10 in wirelessly sending and receiving RF signals.

In exemplary embodiments, the antenna may be configured to be operable with a voltage standing wave ratio (VSWR) of less than 2:1 (i.e., SWR along the vertical axis between 2 and 1) within a first frequency range 44, a second frequency range 45 and a third frequency range 46, where each is primarily associated with monopole resonating structures provided by regions 20*a*, 20*b*, and 18*a*, respectively, described earlier for main radiator 42, ground plane 40, and feeding circuit 19, respectively. The first frequency range 44 (low band) may be from about 134 MHz (or 150 MHz) to about 174 MHz within the VHF band, the second frequency range 45 (first high band) may be from about 400 MHz to about 512 MHz within the UHF band, and the third frequency range 46 (second high band) may be from about 600 MHz to about 900 MHz within cellular bands. Thus antenna 10 provides a tri-band antenna, which further includes a wide fourth band 47 which extends from about 400 MHz to about 900 MHz by the SWR being less than 2:1, inclusive of second and third frequency ranges 45 and 46, and frequencies between those ranges. As described earlier, one or more of first and second layers 18 and 20 are patterned along substrate 14 to excite higher order modes, such enables antenna 10 to further operate over frequencies between two successive ones of the second and third frequency ranges 45 and 46 along the RF spectrum, and thereby promotes antenna 10 wideband performance over fourth band 47 inclusive of second and third frequency ranges 45 and 46 and frequencies therebetween. Triangle shaped markers numbered 1 through 10 are noted on the plot at legend 48. A different frequency performance can be achieved using different patterns of conductive material for region 18*a* (feeding circuit 19) of first layer 18, and region 20*a* (main radiator 42) and region 20*b* (ground plane 40) of second layer 20, as desired for the particular application of antenna 10.

Figure 8A:
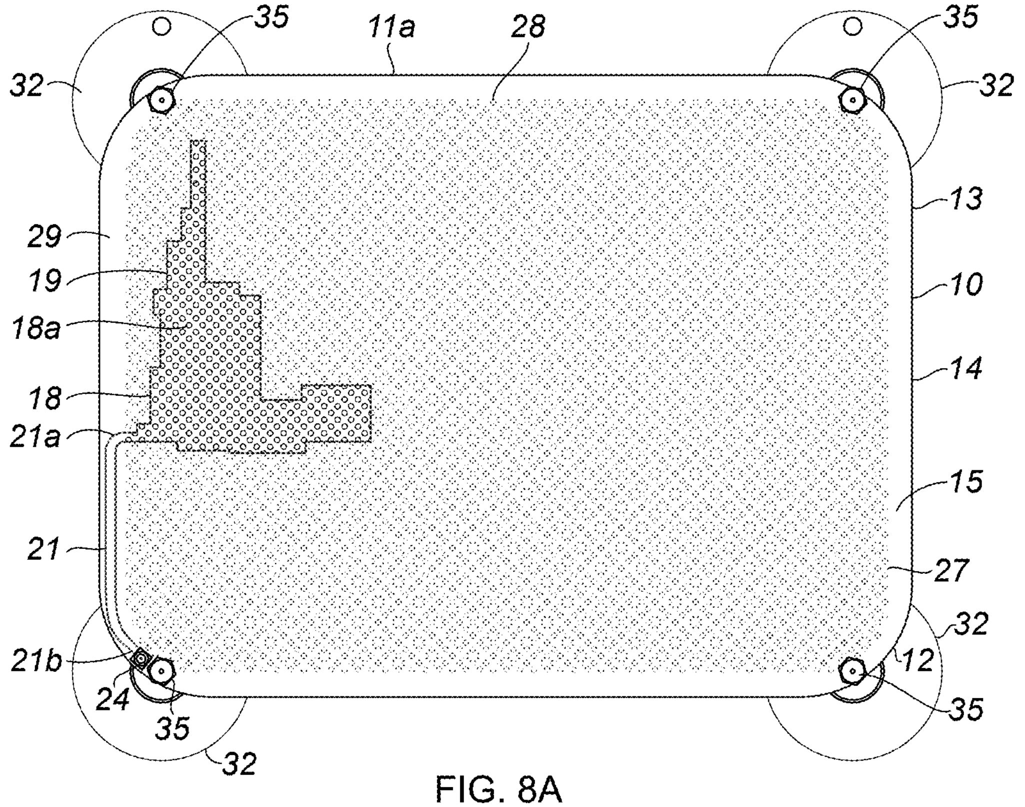
FIGS. 8A and 8B are the same views as FIGS. 1A and 1, respectively, of another embodiment of the antenna of FIGS. 1A-D without the body of the antenna having a protruding lower portion or base, and four rather than two fixtures are shown in the form of suction cups for mounting the antenna to a window.
Figure 8B:
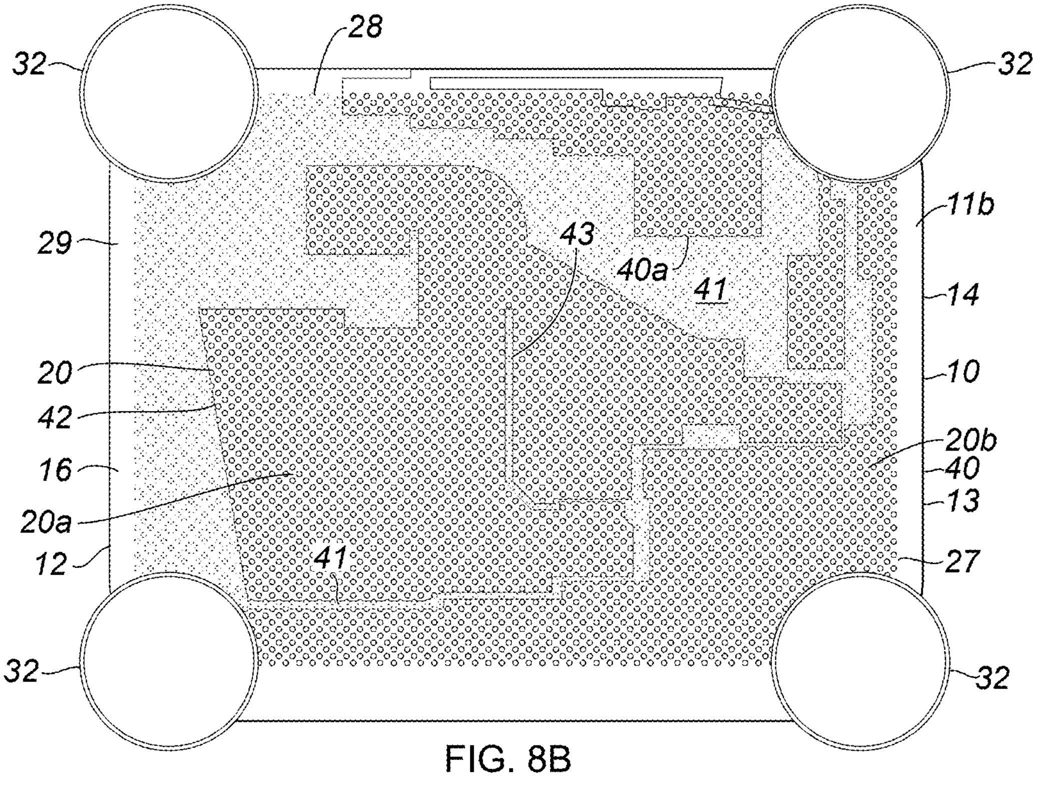

Referring to FIGS. 8A and 8B, another embodiment of antenna 10 is shown which is the same as antenna 10 described above, except lower portion 12*a* of body 12 is not provided. In this embodiment, two additional ones of holes 30 are placed adjacent edge 13 along the bottom two corners of body 12 in area 29, and two additional ones of suction cups 32 with threaded shafts 34 via such holes tighten into additional nuts 35, thereby providing four suction cups 32 for use in releasably attaching antenna 10 to window 37 as shown in the FIG. 9 example installation of antenna 10 of this embodiment to window 37 of vehicle 36. The operational performance of the antenna 10 without lower portion 12*a* is same or similar to that described in connection with FIG. 7. The position of the antenna 10 with respect to window 37 may be different than shown or may be differently oriented (e.g., rotated 180 degrees or any angle therebetween) as desired so long as suction cups 32 mount to releasably attach antenna 10 to interior surface 38 of window 37. The forming of body 12 of antenna 10 of this embodiment is the same as described earlier, except that substrate 14 has a shape, such as a square or rectangle with optional rounded corners, that will provide the desired overall profile along outer perimeter of edge 13 without protruding lower portion 12*a*. For example, antenna 10 of this embodiment may be about 14.2 inches in length, about 10.8 inches in height, with a maximum thickness of about 0.068 inches, representing upper portion 12*b* of antenna 10 of FIGS. 1A-D without lower portion 12*a*, but other dimensions may be used. One benefit of this embodiment is that frame area 29 along back 11*a* and front 11*b* of body 12 of antenna 10 appears even along outer perimeter of edge 13 about area 27 occupied by holes 28 (from left to right and top to bottom perspectives) like a typical sunshade for a vehicle, and enables versatility in installation positions (i.e., either elevated or not elevated above window slot 39) along any side or rear vehicle window, fixed or movable, sufficient in size for mounting the antenna.

Figure 10:
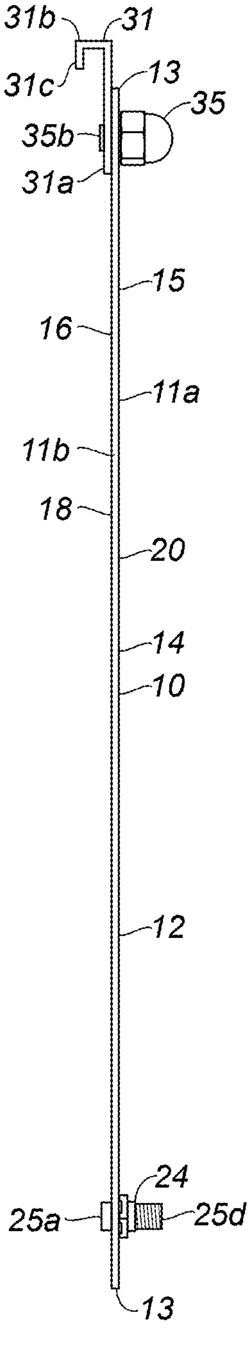
FIG. 10 is the same view as FIG. 1D showing an example of another type of fixture(s) for mounting the antenna of FIGS. 8A and 8B to a window in the form of one clip, or two separate clips.

While fixtures are shown in the case of suction cups 32, other fixtures for detachably mounting antenna 10 to window 37 may alternatively be used, such as clip(s), a deformable member, or double-sided clear tape. For example, mounting may be enabled using two clips 31 along or near the top two corners of body 12, as shown in example in FIG. 10. Each clip 31 having one end 31*a* attached to body 12 along area 29, such as using holes 30 in body 12 and a screw 35*b* tightened in a nut 35 after passing through a hole in end 31*a* of clip 31, and another end 31*b* of clip 31 extends upward to provide a c-shaped hook member 31*c* that hooks over the top edge of the glass (or other material) providing the window. Instead of using nuts 35 and screws 35*b* for attachment of each clip 31, a clamp or another clip may be provided that frictionally engages the top of edge 13 of body 12 and end 31*a* of clip 31. Alternatively, rather than two clips 31, the clip shown in FIG. 10 may represent a side end view of a single large clip 31 of a width that extends at least substantially along a width of antenna 10. Such single large clip 31 being similarly coupled at end 31*a* to body 12 by nuts 35 and screws 35*b*, or by a clamp or another clip along top of body 12, with a hook member 31*c* that hooks over the top edge of the glass of the window. The top edge of the glass of window 37 being made accessible to mount clip(s) 31 by being moved (or rolled) down to a partially open state, and the window may be moved back up into to a closed state in its frame after member 31*c* is hooked over the window's top edge, which can further retain clip(s) 31 to the window. Combinations of different types of fixtures, such as clip(s) 31 and/or one of more of suction cups 32, may be used. For example, clip(s) 31 may be used to retain the top of antenna 10 to a window, and suction cup(s) 32 may be provided along bottom corners of body 12, or otherwise along the bottom of antenna 10 in area 29, in the same manner as suction cups are mounted in FIGS. 1A-D along the top corners of body 12.

Figure 11:
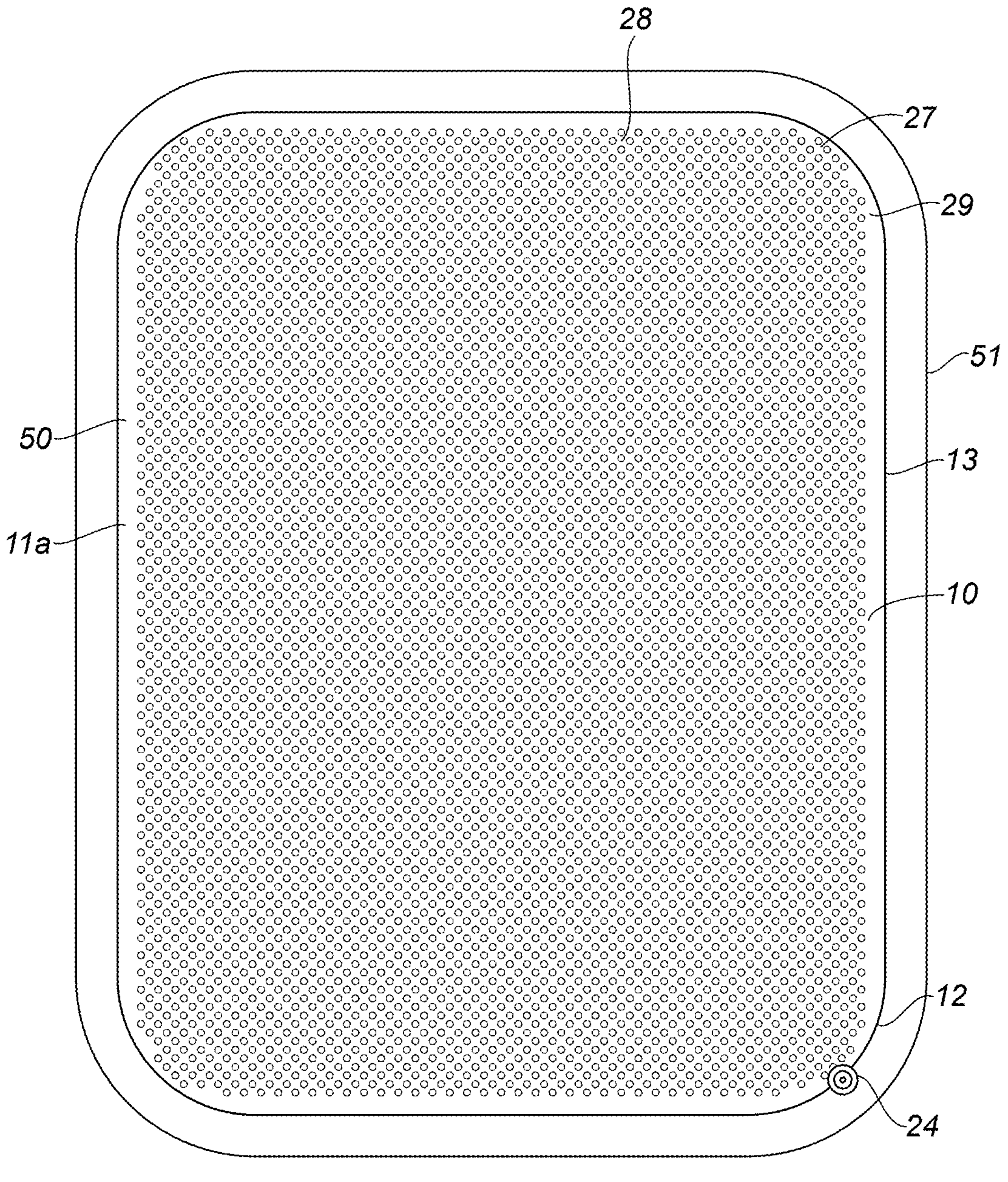
FIG. 11 is the same view as FIG. 8A in a half-turn (90 degrees counterclockwise) orientation without suction cups showing a further example of another type of fixture for mounting antenna along a window in the form of a deformable member enabling press-fit of the antenna against the frame of the window.

Referring to FIG. 11, another example for mounting or installing antenna 10 is shown using a fixture of a deformable member 51 of compressible material, such as foam or rubber, where the antenna body 12 is sized approximately to the size of a particular window along which the antenna 10 will be mounted. Deformable member 51 is attached or engaging along the outer perimeter of body 12 long its entire edge 13 enabling the antenna 10 to press-fit against the frame of such window so that front 11*b* of body 12 of antenna 10 extends along the interior surface of a window, where such frame of the window supports and extends around the physical material window. The antenna 10 shown in FIG. 11 may be of the embodiment of FIGS. 8A and 8B without use of suction cups 32 or holes 30. Other fixtures than suction cups 32, clip(s) 31, or deformable member 51, may be used for mounting or installing antenna which similarly provide no permanent window mount requirements, as for example, double sided clear tape 52 (FIG. 4A) disposed between front 11*b* and the interior surface 38 of the window (i.e., without suction cups 32 or other earlier described fixtures), such as along area 29 in one or more strips. Preferably, double-sided clear tape 52 used can be releasably mounted to a window's interior surface without causing permanent surface damage thereto by leaving no, little, or easily removable residue. Other means than fixtures 31, 32, 51, or 52 for detachably mounting antenna 10 to an interior surface of a window may be used which unlike typical covert antennas is preferably non-destructive by having no permanent window mount requirements to either the window, or the vehicle or structure having such window.

The desired semitransparency of holes 28 along body 12 may be selected by changing the diameter size of holes and spacing between adjacent holes 28, however holes 28 cannot be sized so large that it would disconnect or hinder connectivity of each of the regions of second layer 20 providing ground plane 40 or main radiator 42, or would make body 12 look less disguised as a sunshade. While holes 28 may be equally distributed along body 12 in area 27, it has been found that while holes appear equally distributed there may be slight offsets to avoid placement at location which may negatively affect antenna performance, and thus holes 28 may be non-uniformly distributed in their spacing along where layers 18 and 20 are present upon substrate 14 while preserving the overall look of body 12 of equal distributed holes 28 sunshade screening appearance.

While the embodiments shown in the figures are useful, different ones of antenna 10 may be provided having different sizes or shape of body 12 in accordance with the size of a window, or desired area 27 with holes 28 for sun screening. For instance, antenna 10 may be sized smaller than shown in the example of FIG. 9 for mounting upon the quarter glass window of a vehicle. If same or similar performance is desired such as shown in FIG. 7, patterning of layers 18 and 20 along substrate 14 may be the same or similar as shown in the figures, but sized larger or smaller to accommodate desired size of substrate 14.

Less preferably, fewer than three RF ranges or bands 44, 45, and 46 of antenna 10 operation may be provided than shown in FIG. 7 by changing the shape and size of first layer 18 and/or second layer 20 of antenna 10 prior to drilling of holes 28 through body 12. In such case, first layer 18 may be configured smaller than shown in FIGS. 1A, 1C, 3, and 5 so that while providing a feeding circuit 19 to capacitively convey and receive RF signals with the second layer 20, via substrate 14, its conductive material does not provide region 18*a* shaped and sized as a monopole resonating structure. Additionally, or instead, conductive material of the second layer 20 may be configured to provide a single radiating structure of main radiator 42 of desired size and shape to provide desired monopole antenna performance, either without ground plane 40, or with a ground plane 40 of a shape and size to provide a gap 41 that can enhance performance of main radiator 42 without being itself a monopole resonating structure. Accordingly, different ones of antenna 10 with different frequency performance may be provided, each having holes 28 that provides semitransparency along a majority of the body 12 of the antenna 10 to appear as a typical sunshade or blind as may be typically mounted on a window on a vehicle.

In a less preferred non-portable embodiment, front 11*b* of body 12 of antenna 10 may be permanently mounted to the interior surface of the window, such as by using for example, adhesive material, which may be provided by double sided clear adhesive tape which unlike tape 52 described earlier cannot be readily removed. Such permanent installation may be useful in case where the window is fixed in place in a vehicle, such as a rear windshield, or other window or surface non-movable with respect to the body of the vehicle, or along a window of a building.

In summary, an antenna 10 which may be disguised as a sunshade or window blind is provided which can be of low profile against a window surface. The antenna 10 is preferably planar, window mountable and allows for rapid non-destructive installation and removal. The antenna 10 has main radiator 42 and ground plane 40 along front surface 16 of substrate 14 of dielectric material, and is capacitively fed via a feeding circuit 19 on the back surface 15 of the substrate 14. Main radiator 42 is configured with ground plane 40 and feeding circuit 19 to excite multiple modes to achieve multi-band performance. While main radiator 42, ground plane 40, and feeding circuit 19 each provide one of three different monopoles of the antenna, the main radiator 42 provides the main monopole deposited or printed on dielectric substrate 14 and the coplanar ground plane 40 acts as the return path waveguide. An end of the ground plane 40 along region 40*a* may contain a return path for main radiator 42 to capacitively excite higher order modes. Feeding circuit 19 in addition to capacitively feeding main radiator 42 may also excite higher order modes in the main radiator 42. The appearance of body 12 of antenna can be configured according to desired application, such as by perforating the body 12 with holes 28 to resemble a semitransparent sunshade or window blind. Different patterning may be provided than shown in the figures for main radiator 42, ground plane 40, and feeding circuit 19 in order to provide different RF characteristics with less or more than three frequency ranges or bands of operation as desired.

From the foregoing description, it will be apparent that an antenna providing a window mountable semitransparent sunshade, and method for making same, have been provided. Variations and modifications of the herein described antenna and method will undoubtedly suggest themselves to those skilled in the art. Accordingly, the foregoing description should be taken as illustrative and not in a limiting sense.

The invention claimed is:

1. An antenna providing a semitransparent sunshade for screening sunlight comprising:

a body composed of a substrate of dielectric material having two opposing surfaces, and two different patterned layers of conductive material each along a different one of said opposing surfaces, in which a first of said layers is configured for capacitively conveying and receiving, via said substrate, RF signals with a second of said layers, and at least said second of said layers is configured to enable said RF signals to be wirelessly sent and received, wherein said body has a front and a back each characterized by a different one of said two opposing surfaces of said substrate and a different one of said first and second of said layers; and a plurality of holes, perforating said body through said front and said back thereof, distributed along said body to enable a majority of said body appear semitransparent for screening sunlight where said holes are present.

2. The antenna according to claim 1 wherein said body has an edge defining an outer perimeter of said body, and along each of said front and said back of said body said holes are distributed evenly or at least appear to be evenly distributed over a first area, and surrounding said first area is a second area, between said first area and said edge, and said second area is without any of said holes, and wherein said first area occupies said majority of said body by substantially extending along an entirety of each of said front and said back of said body.

3. The antenna according to claim 2 wherein said first and second of said layers are disposed along said back and said front of said body, respectively, and said antenna further comprises:

a transmission line for communication of said RF signals with said first of said layers, wherein said transmission line has a first end and a second end, said first end is coupled to said first of said layers, said transmission line extends from said first end along a portion of said second area of said back of said body to said second end; and a connector mounted to said body and connected to said second end of said transmission line.

4. The antenna according to claim 2 wherein said plurality of holes are distributed in two-orthogonal dimensions along said body with adjacent ones of said holes configured in proximity to each other to enable said body to appear semitransparent along said first area when viewed from said back or said front of said body.

5. The antenna according to claim 1 wherein said second of said layers provides two different radiating structures separated from each other along said substrate, each of said two different radiating structures being operative to wirelessly send and receive said RF signals over two different first and second ranges of frequencies, and said first of said layers being disposed along said substrate for capacitively conveying and receiving, via said substrate, said RF signals with each of said two different radiating structures.

6. The antenna according to claim 5 wherein said first of said layers provides another radiating structure operative to wirelessly send and receive said RF signals over a third range of frequencies different from said first and second ranges of frequencies.

7. The antenna according to claim 6 wherein said another radiating structure represents a feeding circuit, said two different radiating structures represent a ground plane and a main radiator, and one or more of said feeding circuit and said ground plane excites higher order modes in said main radiator during RF operation of said antenna.

8. The antenna according to claim 6 wherein one or more of said first and second of said layers are disposed along said substrate to enable said antenna to further operate over frequences between two successive ones said first, second, third ranges of frequencies along an RF spectrum.

9. The antenna according to claim 6 wherein two or more of said another radiating structure and said two different radiating structures operate to enable a wideband operation of said antenna inclusive of two successive ones of the first, second, and third ranges of frequencies along a RF spectrum, and frequencies between said two successive ones of the first, second, and third ranges of frequencies.

10. The antenna according to claim 1 wherein said first of said layers has a monopole resonating structure operative to wirelessly send and receive said RF signals, and said second of said layers has at least one monopole resonating structure operative to wirelessly send and receive said RF signals.

11. The antenna according to claim 1 wherein only said second of said first and said second of said layers has any monopole resonating structure operative to wirelessly send and receive said RF signals.

12. The antenna according to claim 1 wherein said body is mountable along a surface of a physical material window utilizing one or more fixtures, and said holes enable said body to appear and operate as a sunshade for screening sunlight from said window via said holes.

13. The antenna according to claim 12 wherein said one or more fixtures are one of:

a plurality of suction cups, in which said body has an edge defining an outer perimeter of said body, and said suction cups are attached, spaced from each other, along said body at positions adjacent said edge;

one or more clips, wherein each of said one or more clips comprises one end attached to said body and another end with a hook member that hooks over a top edge of said window;

a deformable member along an outer perimeter of said body enabling said antenna to press-fit against a frame of said window; or double-sided tape disposed between the front of said body and the surface of said window.

14. The antenna according to claim 12 wherein said body has an upper portion with said holes and a lower portion without said holes, said lower portion is positionable into a slot of a vehicle door from which said window extends, and said upper portion is attached to said surface of said window by said fixtures.

15. The antenna according to claim 1 further comprising means for detachably mounting said body to an interior surface of a window.

16. The antenna according to claim 1 wherein said substrate, and said first and said second of said different layers extend along parallel planes with each other.

17. The antenna according to claim 1 wherein said substrate has a curvature and said first and said second of said different layers each follow said curvature along the one of said opposing surfaces of said substrate respectively associated therewith.

18. The antenna according to claim 1 further comprising a coating layer upon said body and along an interior surface of each of said holes, and said coating layer being black in color.

19. The antenna according to claim 1 further comprising a connector upon said body electrically connected to said first of said layers to enable communication of said RF signals to be transmitted to said antenna and received from said antenna.

20. The antenna according to claim 1 wherein said plurality of holes, perforating said body through said front and said back thereof, are distributed at different positions along said body to extend through said substrate and through any of said two different patterned layers of conductive material where present along said substrate at said different positions.

21. An antenna comprising:

a body composed of a substrate of dielectric material having two opposing surfaces each having one of two different patterned layers of conductive material;

a first of said layers provides a first radiating structure over a first frequency band;

a second of said layers provides a second radiating structure over a second first frequency band and a third radiating structure over a third frequency band;

at least two of said first, second, and third radiating structures are disposed along said body to enable said antenna to further operate over frequencies between two successive ones of said first, second, and third frequency bands along an RF spectrum; and said first of said layers being disposed along said substrate for capacitively conveying and receiving RF signals with each of said second and third radiating structures via said substrate.

22. The antenna according to claim 21 wherein said at least two of said first, second, and third radiating structures are disposed along said body to enable a fourth frequency band inclusive of said two successive ones of said first, second, and third frequency bands along the RF spectrum and said frequencies between said two successive ones of said first, second, and third frequency bands along the RF spectrum.

23. The antenna according to claim 21 further comprising a plurality of holes perforating said body are distributed along a substantial majority of said body to enable said body to appear semitransparent for screening sunlight where said holes are present.

24. The antenna according to claim 21 further comprising a connector upon said body electrically connected to said first of said layers for communication of said RF signals with said first of said layers.

25. The antenna according to claim 21 wherein a portion of said third radiating structure provides a return path for said second radiating structure to capacitively excite higher order modes of operation in said second radiating structure, and said first radiating structure excites higher order modes of operation in said second radiating structure.

26. A method for making a semitransparent sunshade antenna for screening sunlight comprising steps of:

forming a body composed of a substrate of dielectric material having two opposing surfaces, each having one of two different patterned layers of conductive material, in which a first of said layers is configured for capacitively conveying and receiving RF signals, via said substrate, with a second of said layers, and at least said second of said layers is configured to enable said RF signals to be wirelessly sent and received; and perforating said body, through a front a back thereof, with a plurality of holes distributed along said body to enable a majority of said body appear semitransparent for screening sunlight where said holes are present, wherein said front and said back of said body are each characterized by a different one of said two opposing surfaces of said substrate and a different one of said first and second of said layers.

27. The method according to claim 26 further comprising a step of coating said body to be uniformly black in color to have an appearance of a sunshade when applied to a window.

28. The method according to claim 26 further comprising a step of providing a connector upon said body electrically connected to said first of said layers for communication of said RF signals to and from said antenna.

* * * * *